United States Patent [19]

Ward et al.

[11] 4,368,694
[45] Jan. 18, 1983

[54] LEAK DETECTION SYSTEM FOR A STEAM GENERATOR

[75] Inventors: Charles T. Ward; Ronald B. Creek, both of Chattanooga, Tenn.

[73] Assignee: Combustion Engineering, Inc., Windsor, Conn.

[21] Appl. No.: 265,879

[22] Filed: May 21, 1981

[51] Int. Cl.³ .................... F22B 37/42; F28F 9/02
[52] U.S. Cl. ............................... 122/504; 122/34; 165/70; 165/158
[58] Field of Search ............... 122/34, 504; 165/11 R, 165/70, 158; 137/312

[56] References Cited

U.S. PATENT DOCUMENTS

| | | | |
|---|---|---|---|
| 3,129,697 | 4/1964 | Trepaud | 122/34 |
| 3,825,061 | 7/1974 | Bathla | 165/70 |
| 3,924,675 | 12/1975 | Essebaggers | 165/70 |
| 4,163,470 | 8/1979 | Johnsen et al. | 165/70 |
| 4,182,407 | 1/1980 | Lagerwerf et al. | 165/70 |
| 4,182,408 | 1/1980 | Laber | 165/70 |
| 4,237,968 | 12/1980 | Duke | 165/70 |
| 4,249,593 | 2/1981 | Bieberbach et al. | 165/70 |
| 4,276,927 | 7/1981 | Foust | 165/70 |

*Primary Examiner*—Henry C. Yuen

*Attorney, Agent, or Firm*—Arthur E. Fournier, Jr.

[57] ABSTRACT

A leak detection system 40 particularly suited for employment in a steam generator 10 of the type that embodies at least one tube sheet 34 or 36 to which ends of a multiplicity of elongated tubular members 32 are suitably secured. The subject leak detection system 40 is operative both for purposes of detecting the occurrence of leaks in the steam generator 10 as well as for purposes of enabling a determination to be made as to the probable location of the leaks and the direction of flow of the leaking fluid. The subject leak detection system 40 includes circuit means formed in the tube sheet 34 or 36 so as to provide passages therethrough operative for effecting the interconnection of the exterior surface of the tube sheet 34 or 36 with the ends of the tubular members 32 that are retained therein, fluid filled plenum means 62, 64 operatively connected in fluid flow relation with the circuit means, and sensing means 46, 48 operatively connected to the plenum means 62, 64 for sensing the occurrence of fluid related changes in the plenum means 62, 64 and determining from the nature of such changes the existence of leaks in the steam generator 10 as well as the probable location of such leaks and the direction of the leakage path that the leaking fluid will follow.

10 Claims, 7 Drawing Figures

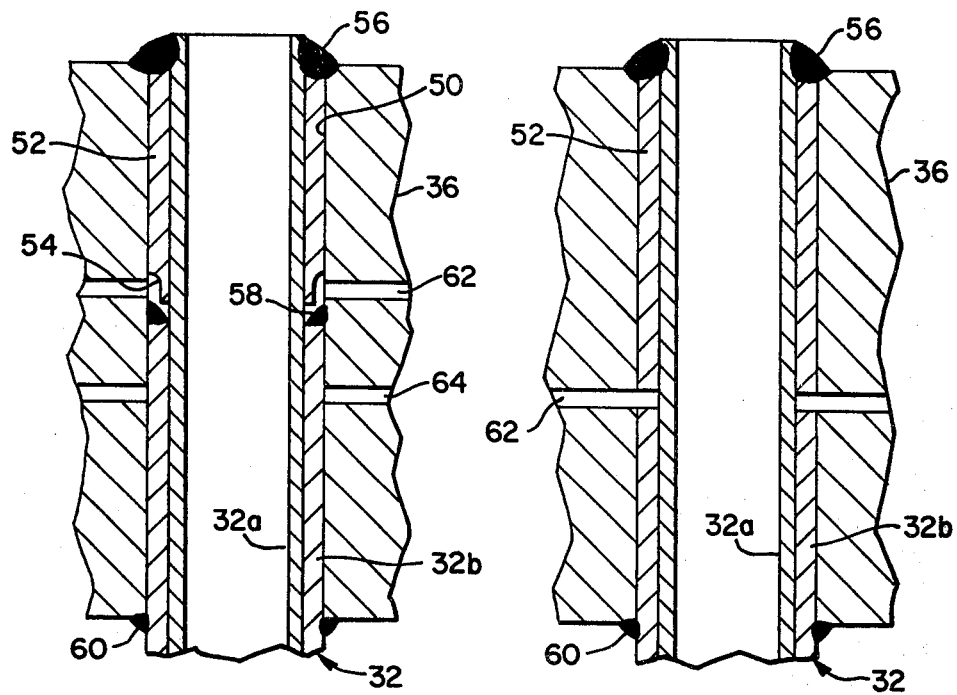
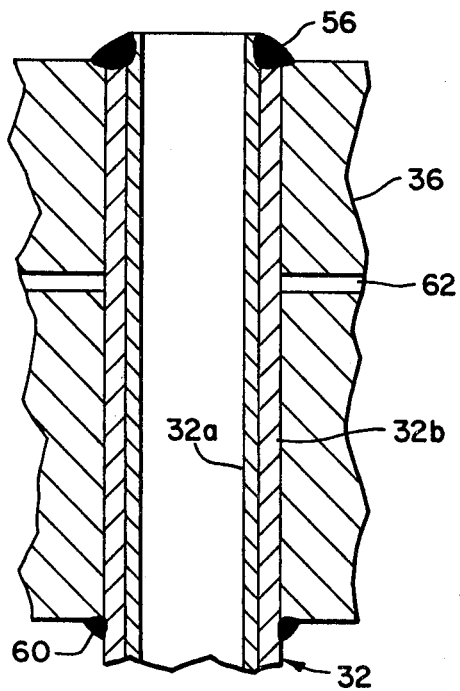

LEAK DETECTION SYSTEM FOR A STEAM GENERATOR

BACKGROUND OF THE INVENTION

This invention relates to a leak detection system, and more particularly to a leak detection system that is capable of being employed for purposes of not only determining the occurrence of a leak in a substantially closed vessel but also for determining the probable location and/or direction of flow of the leak therewithin.

To those skilled in this field of art, it is well-known that one of the major operating components of any steam generation system is the steam generator. For, it is within the latter that the transformation of water into steam is effectuated. In this regard, such a steam generator may be viewed as comprising a substantially closed vessel within which a pair of operating fluids are made to flow such that heat is transferred from one of the pair of operating fluids to the other and without the occurrence of any commingling of the two operating fluids.

Commonly, the construction of the steam generator referred to above is such that one of the operating fluids is made to flow through a multiplicity of tubes that are provided for this purpose in the steam generator, while the other operating fluid is made to flow in surrounding relation to the aforesaid multiplicity of tubes. Moreover, in accord with conventional practice, the ends of the tubes are suitably retained within a pair of spaced tube sheets. That is, the subject steam generator is generally substantially cylindrical in configuration, and has a tube sheet suitably mounted therewithin such as to be positioned adjacent to but spaced from each of the ends of the steam generator. Each of the multiplicity of tubes in turn is suitably supported within the steam generator so as to extend longitudinally therewithin with the respective ends thereof emplaced in a corresponding one of the aforesaid pair of spaced tube sheets.

Leaks are known to occur in steam generators that embody the type of construction, which has been described above. Moreover, one source of such leaks is known to be attributable to tube failures. Another known source of these leaks is a failure in one or more of the welds that are employed for purposes of affixing the ends of the tubes to the tube sheets. For obvious reasons, it is desirable that the occurrence of such leaks be minimized. However, it is also equally desirable that the existence of such leaks be noted as soon as possible after their commencement so that, where deemed appropriate, suitable corrective measures may be immediately initiated. This is done primarily so as to minimize the extent to which the respective operating fluids become commingled.

Commingling of the two operating fluids is to be avoided for various reasons. For example, in the case of PWR applications wherein the steam generator is connected in fluid flow relation directly to a nuclear reactor, one of the two operating fluids; namely, that which is at the higher temperature is made to circulate between the nuclear reactor and the steam generator. Moreover, in the course of its passage through the nuclear reactor this operating fluid becomes exposed to radiation such that by the time it leaves the nuclear reactor and enters the steam generator it possesses radioactive contamination. It is, therefore, desirable that a commingling of this operating fluid, which possesses radioactive contamination, with the other operating fluid that is being circulated through the steam generator be avoided, so as to prevent the latter from becoming contaminated with the radiation that is possessed by the former.

Another situation wherein the commingling of the two operating fluids is to be avoided is where the latter are dissimilar. For example, it is known to employ a liquid metal as one of the operating fluids in the steam generator of a nuclear-powered steam generation system. More specifically, in such systems it has been proposed to employ a liquid metal such as sodium as one of the two operating fluids in the steam generator, with water being the other operating fluid. However, in view of the fact that an admixture of water and sodium is known to be capable of producing a violent reaction, particular consideration must be given to the avoidance of any commingling thereof when these two fluids are being utilized as the respective operating fluids in a steam generator.

Having thus set forth some of the various reasons as to why a commingling of the operating fluids is desirably to be avoided in the steam generator, attention will now be directed to a consideration of some of the potential sources of leaks which can occasion such a commingling of the two operating fluids. By way of exemplification in this regard, one potential source of leaks is a failure in the tubes through which one of the operating fluids is designed to flow while being kept isolated from the other operating fluid in terms of any commingling of fluid therebetween, but while yet permitting a transfer of heat to occur between the respective fluids. It is known in the construction of such steam generators to employ either single tubes that extend substantially the length of the steam generator as well as so-called duplex tubes. In accord with the latter form of construction, each tube consists of a pair of concentric tubes with a suitable space being formed therebetween. Obviously, in the case of the form of construction wherein a single tube is employed, should a failure in the tube occur, there would be an immediate commingling of the operating fluid flowing through the tube with the operating fluid flowing in surrounding relation to the tube which failed. The extent to which an admixture of the respective operating fluids would occur is a function of many variables including such things as, for example, the size of the leak, the relative pressures of the two operating fluids, etc. On the other hand, in the case of the so-called duplex tube, should a failure occur in either the inner tube or the outer tube thereof but not in both, it is unlikely that any commingling of the two operating fluids would take place inasmuch as the good tube, i.e., the inner tube or the outer tube which ever one did not fail, would continue to function as an isolating barrier between the operating fluid flowing in the duplex tube and the operating fluid flowing in surrounding relation to the duplex tube.

In accord with conventional practice, the tubes, be they in the form of either a single tube or a duplex tube, are commonly affixed to the tube sheets by means of welding. More specifically, the tubes are ordinarily welded to the tube sheets on either side of the latter at the locations whereat the former pass therethrough. In addition, the tubes may also be welded to the tube sheets at any other location where it may be deemed desirable to establish such a weld. With regard to the matter of potential sources of leaks, any of the aforementioned welds that are made between the tubes and tube sheets may give rise to a leak which could enable the two operating fluids to commingle. Whether or not a weld failure gives rise to the possibility of the respective operating fluids commingling obviously depends on whether the failure of the particular weld in question enables a through passage to be established between the respective flow paths of the two operating fluids. Based on experience of those skilled in this art, it has been found that the probability of the occurrence of a weld failure is deemed to be considerably more likely than the occurrence of a tube failure be the tube either a single tube, i.e., a single wall tube, or a duplex tube, i.e., a double wall tube.

Although either tube leaks or weld leaks may individually give rise to a commingling of the respective operating fluids, the existence of an admixture of operating fluids may also be caused by a combination of both tube and weld leaks. That is, a situation may arise wherein a tube leak occurs as well as a weld leak, although neither alone is sufficient to cause a commingling of the operating fluids to take place. However, the collective effect of the concomitant failure of a particular tube or tubes when combined with the failure of a particular weld or welds may be sufficient to create a through path for fluid flow from one of the operating fluids to the other and thereby cause a commingling thereof to come about.

There has been some attention directed by the prior art to this matter of the admixture of respective operating fluids in a steam generator caused by the occurrence of leaks therein that result in the establishment of a passage through which fluid may flow from one operating fluid to another. Exemplary of this attention is the teachings to be found contained in U.S. Pat. No. 3,129,697—Trepaud. Namely, as taught in the latter patent, a leak detection system is provided wherein each of a pair of tube sheets is divided into two segments, i.e., two complementary half plates. At least one of the segments of each pair thereof of each of the tube sheets is provided with a plurality of grooves that operatively connect together in series relation a number of circular recesses that are suitably located in surrounding relation to the ends of the tubes that are associated with the tube sheets. The mode of operation of the aforedescribed prior art form of leak detection system is such that should a leak develope between the tube and the corresponding surrounding portion of the tube sheet, the leaking fluid is designed to make its way into one of the circular recesses described above, and therefrom into one of the grooves also described above from whence the fluid that has leaked is caused to be discharged at a pre-selected location. No attempt is made, however, in accordance with the teachings of U.S. Pat. No. 3,129,697—Trepaud to discern the specific source of the leak. Another disadvantage associated with the use of the leak detection system as taught in the Trepaud Patent is that it is predicated on the use of complementary half plates. Accordingly, since each of the tube sheets is formed in the manner of a pair of complementary half plates, a need exists to provide a fluid-tight seal between each pair of half plates. Unfortunately, as is well-known to all, it is extremely difficult to establish a fluid-tight seal between a pair of mating surfaces. More specifically, as applied to the Trepaud Patent, it is extremely difficult to prevent fluid from migrating from one series of groove interconnected recesses across the face of the half plate to another series of groove interconnected recesses, notwithstanding how tight the half plates may have been secured together. Namely, it is well-known that the establishment of a totally fluid-tight seal between two mating surfaces that are made of metal is extremely difficult to achieve. Thus, it is not surprising that in the case of the leak detection system taught in U.S. Pat. No. 3,129,697, the isolation between grooves and/or recesses which would be required in order to provide a leak detection system that embodies the capability of enabling a determination to be had as to the probable location and/or direction of flow of a leak that has occurred is unachieveable with the structure as taught in the subject Trepaud Patent.

Therefore, notwithstanding the teachings of the prior art as exemplified, for instance, by those found contained in U.S. Pat. No. 3,129,697, a need has existed for a new and improved leak detection system. More specifically, a need has been shown for a new and improved form of leak detection system that would be particularly suited for use in a steam generator wherein it is desired to prevent the operating fluids flowing therethrough from commingling. Preventing the creation of an admixture of the respective operating fluids may be occasioned wherein both operating fluids are similar in nature by the desire to prevent one of these operating fluids from becoming contaminated by the radiation contamination possessed by the other, or wherein the operating fluids are dissimilar in nature by the desire to prevent the generation of a violent reaction occasioned by the mixing together of the two operating fluids wherein one of the latter is a liquid metal such as sodium and the other is water.

Namely, a need has been evidenced for a new and improved leak detection system that would be operable for purposes of sensing the occurrence of a leak that was caused by a tube failure, a weld failure, or a combination of tube and weld failure. Moreover, such a new and improved form of leak detection system should be operable for purposes of sensing the occurrence of a leak caused by a tube failure irrespective of whether the tube consists of a single tube, i.e., a single wall tube, or a duplex tube, i.e., a double wall tube. Furthermore, such a new and improved leak detection system should also embody the capability of enabling a determination to be had based on a sensing made thereby as to the probable location and/or direction of flow of the leak that was sensed.

It is, therefore, an object of the present invention to provide a new and improved form of leak detection system that is suitable for use in a steam generator and which is operable therein for purposes of detecting a leak that could give rise to the commingling of a pair of operating fluids that desirably are designed to flow through the steam generator in fluid isolation one to another.

It is another object of the present invention to provide such a leak detection system that is operable to detect a leak of an operating fluid in a steam generator caused by a tube failure.

It is still another object of the present invention to provide such a leak detection system which is operable to detect a leak caused by a tube failure wherein the tube is a single tube, i.e., of a single wall construction.

A further object of the present invention is to provide such a leak detection system which is operable to detect a leak caused by a tube failure wherein the tube is a duplex tube, i.e., of double wall construction.

A still further object of the present invention is to provide such a leak detection system which is operable to detect a leak of an operating fluid in a steam generator caused by a weld failure.

Yet another object of the present invention is to provide such a leak detection system that is operable to detect a leak of an operating fluid in a steam generator caused by a combination of a tube failure and a weld failure.

Yet still another object of the present invention is to provide such a leak detection system which embodies the capability of enabling a determination to be had as to the probable location and/or direction of flow of the leak that has been sensed, based on the sensing thereof that has been made thereby.

SUMMARY OF THE INVENTION

In accordance with the present invention, there is provided a new and improved form of a leak detection system which is particularly suited for employment in a steam generator of the type that embodies a pair of spaced tube sheets in which the opposite ends of a multiplicity of tubes are suitably supported. The subject leak detection system is operative for purposes of detecting and identifying the nature of leaks occurring within the steam generator, and more specifically, the leaks of the type that are occasioned by either tube failures, weld failures, or a combination of both tube and weld failures. Weld means operative for welding the ends of the tubes to the corresponding tube sheets are provided at predetermined locations. Circuit means are formed in the tube sheets operative to provide passages therethrough interconnecting the exterior of the tube sheets to the corresponding tube ends supported therewithin. The circuit means are in turn operatively connected in fluid flow relation with fluid filled plenum means. Finally, sensing means are operatively connected to the plenum means for sensing the occurrence of changes in the nature of the fluid contained in the plenum means, and determining therefrom the existence of a leak within the steam generator as well as identifying the location and/or direction of flow thereof.

BRIEF DESCRIPTION OF THE DRAWING

FIG. 3 is a cross-sectional view of a portion of a tube sheet of a steam generator illustrating one method of use of a leak detection system constructed in accord with the present invention;

FIG. 4 is a cross-sectional view of a portion of a tube sheet of a steam generator illustrating a second method of use of a leak detection system constructed in accord with the present invention;

FIG. 5 is a cross-sectional view of a portion of a tube sheet of a steam generator illustrating a third method of use of a leak detection system constructed in accord with the present invention;

DESCRIPTION OF THE PREFERRED EMBODIMENT

Figures 1, 2:
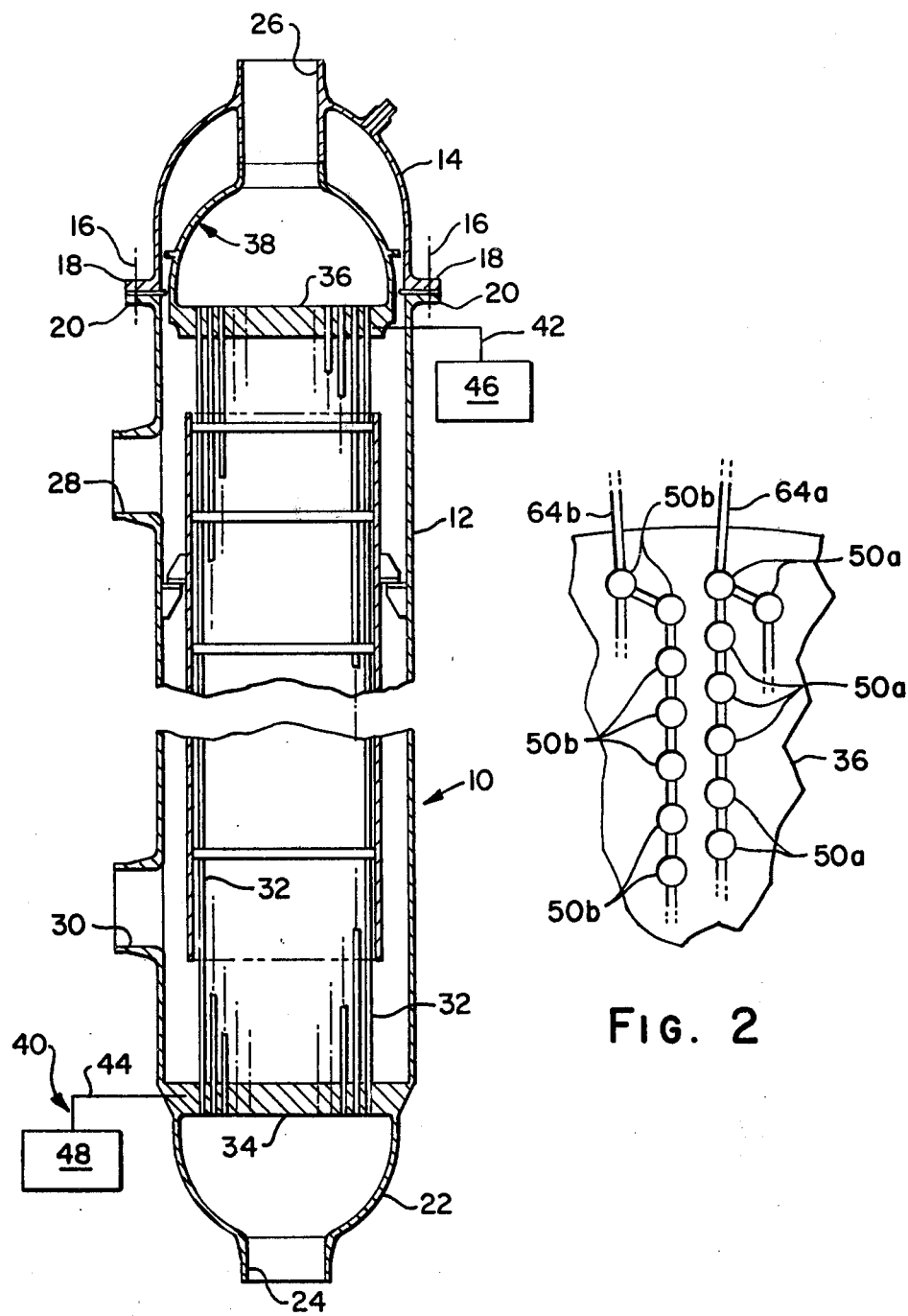
FIG. 1 is a schematic representation of a steam generator that exemplifies one form thereof that has been proposed by the prior art for employment in a nuclear-powered steam generation system.
FIG. 2 is a schematic representation of a portion of the leak detection circuitry employed in a leak detection system constructed in accord with the present invention.

Referring now to the drawing, and more particularly to FIG. 1 thereof, there is depicted therein a schematic representation of a steam generator, which embodies a known form of construction and which has been designated in FIG. 1 by reference numeral 10. Inasmuch as the subject matter of the present invention is not limited in its applicability to a steam generator embodying a specific form of construction, the steam generator 10 of FIG. 1 is intended to be representative of any steam generator, with which the invention to which the instant application is directed may be cooperatively associated. As such, and further since the steam generator 10 of FIG. 1 embodies a form of construction which is known to those skilled in the art, it is not deemed necessary to describe in detail herein or to illustrate in the drawing the nature of the construction and/or the mode of operation of the steam generator 10. Rather, should such a detailed description of the steam generator 10 of FIG. 1 be desired, reference may be had for this purpose to the prior art wherein teachings thereof are readily available.

For purposes of acquiring an understanding of the present invention, it is deemed sufficient to merely set forth hereinafter the following brief description of the steam generator 10. Thus, with reference to FIG. 1, the steam generator 10 comprises a substantially closed vessel which is formed by a vertically elongated shell 12 that is substantially circular in cross-section. The steam generator 10 has an upper closure cover 14 that is suitably detachably secured to the shell 12 by connectors, the latter being identified in the drawing by means of the center lines 16. The connectors 16 are circumferentially spaced about the mating end flanges 18 and 20, the latter being suitably provided on the respective members, i.e., the closure cover 14 and the shell 12, respectively.

Continuing with the description of the steam generator 10, the lower end of the shell 12, as viewed with reference to FIG. 1 of the drawing, is closed by a generally hemispherical closure 22 that may be integrally attached to the shell 12 through the use of any suitable, conventional form of securing means such as, for example, by welding. The closure 22 is preferably provided with a fluid inlet nozzle 24 that is designed to be suitably connected to a line (not shown) through which, in a well-known fashion, a circulating fluid is designed to flow. Similarly, the upper closure cover 14 is likewise provided with an outlet nozzle 26 through which the aforesaid fluid after being heated in the course of its passage through the steam generator 10 is suitably discharged into a line (not shown), the latter being provided for this purpose in accord with conventional practice. In addition to the nozzles 24 and 26, the steam generator 10 and more specifically, the shell 12 thereof is also provided with another pair of nozzles, i.e., the inlet nozzle 28 and the outlet nozzle 30, that penetrate the wall of the shell 12 at longitudinally spaced locations as shown in FIG. 1 of the drawing. The nozzles 28 and 30 are each designed to be suitably connected to a corresponding one of a pair of circulating lines (not shown) through which in accord with conventional practice another fluid flows in a separate flow path. Namely, in the course of its passage through the steam generator 10 the latter fluid in a manner well-known to those skilled in this art is operative to effect a transfer of heat therefrom to the other fluid which is also being circulated through the steam generator 10 and to which reference has previously been had hereinbefore.

With further regard to the steam generator 10 of FIG. 1, a bundle of vertically elongated, straight tubes 32 that extend in substantially parallel relation one to another are suitably disposed within the steam generator 10. Each of the tubes 32 is adapted to conduct the fluid, which is to be heated in the steam generator 10, through the shell 12. The lower ends of the tubes 32, as viewed with reference to FIG. 1, are suitably attached to a tube sheet the latter being designated in FIG. 1 by means of the reference numeral 34. The tube sheet 34 in a manner well-known to those skilled in this art, extends transversely of the steam generator 10 and, through the use of any suitable conventional form of attachment means, is integrally attached about its periphery to the steam generator 10 preferably at a point therealong located between the shell 12 and the lower closure 22. Similarly, the upper ends of the tubes 32, as viewed with reference to FIG. 1, are suitably cooperatively associated with a tube sheet 36. The latter tube sheet 36, in accord with the form of construction depicted in FIG. 1, is suitably attached to a member, generally designated therein by the reference numeral 38. In the context of acquiring an understanding of the present invention, it is deemed sufficient to merely take note of the fact that the upper ends of the tubes 32, as viewed with reference to FIG. 1 of the drawing, are suitably attached to the tube sheet 36 through the use of any suitable conventional form of attachment means.

The steam generator 10, as depicted in FIG. 1, is shown as embodying a pair of tube sheets 34 and 36 and a multiplicity of parallelly extending elongated tubes 32, the latter each having one end thereof affixed in the tube sheet 34 and the other end thereof affixed in the tube sheet 36. It is to be understood, however, that the subject matter of the present invention is not limited in its applicability to steam generators that embody a pair of tube sheets and a multiplicity of straight tubes. Rather, the subject matter of the present invention is equally suitable for use in a steam generator wherein U-shaped tubes are cooperatively associated with a single tube sheet.

In accord with the teachings of the present invention, the steam generator 10 of FIG. 1 is equipped with a leak detection system, generally designated by reference numeral 40, which is constructed in a manner that is yet to be described herein. However, before commencing with a detailed description of the leak detection system 40 constructed in accord with the present invention, reference is first had to FIG. 1 of the drawing wherein each of the tube sheets 34 and 36 is shown as having an instrumentation system connected in fluid flow relation thereto. For the present, note is simply taken of the fact that the latter instrumentation system comprises instrument tube means 42 and 44, the function of which is to fluidically interconnect the tube sheets 34 and 36 in fluid flow relation with a corresponding instrumentation package 46 and 48, respectively.

For purposes of setting forth hereinafter a description of the nature of the construction and the mode of operation of a leak detection system 40 constructed in accordance with the teachings of the present invention, reference will be had in turn to each of the FIGS. 2–7 of the drawing. Thus, with reference first to FIG. 3 of the drawing, there is depicted therein a portion of a tube sheet. In this regard, for purposes of the description of the leak detection system 40 which follows, note should be made of the fact that the tube sheet shown in FIG. 3 may be considered without departing from the essence of the present invention as constituting a portion of either the tube sheet 34 or the tube sheet 36, both of which are to be found illustrated in FIG. 1 of the drawing. To this end, in the interest of maintaining clarity and consistency throughout the following description, the portion of the tube sheet shown in each of FIGS. 2–7 of the drawing is deemed to comprise a part of the tube sheet 36 of FIG. 1.

Continuing, therefore, now with a description of the structure that is shown in FIG. 3 of the drawing, the tube sheet 36 is provided with a multiplicity of suitably dimensioned openings 50, only one of which can be seen in FIG. 3. The number of such openings 50 corresponds at least to the number of tubes 32 with which the steam generator 10 is provided. Moreover, as previously noted herein each of the tubes 32 is designed to have an upper end thereof, as viewed with reference to FIG. 1 of the drawing, suitably supported in the tube sheet 36. Further, each of the aforesaid openings 50 extends through the entire thickness of the tube sheet 36, and is suitably dimensioned so as to be capable of receiving therewithin one of the respective upper ends of the tubes 32. Thus, from the above it should be readily apparent that the openings 50 function to provide the tube sheet 36 with a series of through passages that are operative for purposes of effecting the passage through the tube sheet 36 of the fluid that flows through the tubes 32.

By way of explanation, it should be noted that the term tube as used herein is being employed in a generic sense. Namely, as was discussed at the outset of the instant specification, it has been proposed in the prior art to construct steam generators that employ either single wall tubes or so-called duplex tubes. This is especially so as regards steam generators of the type that are designed for employment with other components to form a nuclear-powered steam generation system. Moreover, as was also previously set forth hereinbefore, the term duplex tube refers to a tube that embodies a double wall thickness, i.e., is preferably formed by positioning a pair of tubular members that have differing diameters in concentric relation one to another. In this context it is, therefore, to be understood that the reference to tubes 32, with which the steam generator 10 of FIG. 1 is provided, is intended to encompass the utilization in the steam generator 10 of tubes that either take the form of single wall tubes or tubes of double wall thickness, i.e., duplex tubes.

Referring again to FIG. 3 of the drawing, it can be seen with reference thereto that the tube 32, which is depicted therein, comprises a duplex tube. That is, the tube 32 shown in FIG. 3 consists of an inner tubular member 32a and an outer tubular member 32b, the latter being positioned in concentric relation to the former. Since one is not required, for purposes of acquiring an understanding of the nature of the construction and the mode of operation of the leak detection system 40, to have a detailed knowledge of the manner in which the concentric relationship of the tubular members 32a and 32b is effected, such a description of the method of manufacture employed for this purpose has been omitted herefrom except for the brief description thereof that will be found set forth hereinafter in connection with the description of the mode of operation of the leak detection system 40 as applied to the structure depicted in FIG. 3.

With further regard to FIG. 3 of the drawing, in accord with the mode of construction depicted therein, the inner tubular member 32a extends the entire thickness of the tube sheet 36. However, preferably the outer tubular member 32b is of a lesser length, and a spacer member designated in FIG. 3 by reference numeral 52, is utilized in conjunction therewith. The spacer member 52 embodies the same internal and external dimensions as the outer tubular member 32b, and is of sufficient length such that when cooperatively associated with the latter as shown in FIG. 3, the combined length of the spacer member 52 and the outer tubular member 32b substantially equals that of the inner tubular member 32a. Additionally, as will be readily understood with regard to FIG. 3 of the drawing, a spacer member 52 is provided preferably at one end thereof, i.e., the end thereof which is intended to be positioned in juxtaposed relation to the outer tubular member 32b, with a cutaway portion 54 of suitable dimensions and configuration for a purpose yet to be described.

In accord with the teachings of FIG. 3, the tube 32, i.e., the inner tubular member 32a, the outer tubular member 32b and the spacer member 52, is attached to the tube sheet 36 by means of welding. More specifically, as viewed with reference to FIG. 3, the spacer member 52 as well as tubular member 32a are secured to the upper surface of the tube sheet 36 by means of the weld 56. Further, a weld 58 is made at the point whereat one of the ends of the spacer member 52 adjoins, with reference to FIG. 3, the end of the outer tubular member 32b. Lastly, the tube 32 is secured to the lower surface, as viewed with reference to FIG. 3, of the tube sheet 36 by means of weld 60.

Finally, it will be seen with reference to FIG. 3 that the tube sheet 36 has a pair of passages 62 and 64 formed therein. More specifically, the passages 62 and 64 extend from the exterior surface, i.e., the circumference of the tube sheet 36 and terminate at the opening 50. That is, the passages 62 and 64, in a manner which will be made clearer in conjunction with the subsequent description of the structure depicted in FIG. 2 of the drawing, function to interconnect the multiplicity of openings 50 with which the tube sheet 36 is provided such as to provide a series of fluid circuits in the latter for a purpose yet to be described. However, at this point it is sufficient to note that the passage 62 effectively functions in the manner of a first fluid plenum, while the passage 64 likewise effectively functions in the manner of a second fluid plenum. Finally, as will also be further referred to hereinafter, the passages 62 and 64 are operatively connected in fluid flow relation to the instrumentation tube means 42 and therethrough to the instrumentation package 46.

Turning now to a consideration of FIG. 2 of the drawing, there is shown therein a cross-section of a segment of the tube sheet 36. More specifically, FIG. 2 is intended to depict a cross-section taken through one of the passages 62 and 64. To this end, for purposes of the following discussion it is to be assumed that the cross-section which appears in FIG. 2 is taken through the passage, which is designated 64 in FIG. 3.

With further reference to FIG. 2, as illustrated therein the openings 50 with which the tube sheet 36 is provided are suitably interconnected in fluid circuit relation. More specifically, the interconnection of the openings 50 is effected in such a manner as to produce a series of isolated fluid circuits, only two of which are seen in FIG. 2. That is, the openings, which have been designated by means of the reference numeral 50a in FIG. 2 are all fluidically interconnected whereby to form a first isolated fluid circuit, the latter being designated therein by means of the reference numeral 64a. Likewise, the openings, which are identified through the use of the reference numeral 50b in FIG. 2, are all suitably interconnected so as to form a second isolated fluid circuit, the latter being denoted therein by means of the reference numeral 64b. By way of reiteration, it is to be understood that the fluid circuit 64a is fluidically isolated from the fluid circuit denoted in FIG. 2 as 64b. Furthermore, it is to be understood that although not depicted in FIG. 2 in the interest of maintaining clarity of illustration therein, additional fluid circuits similar to the circuits 64a and 64b described above are preferably embodied in the tube sheet 36 wherein they collectively serve to comprise therein the plenum 64, which has been referred to previously hereinabove. Finally, although not shown in FIG. 2 in the interest of maintaining clarity of illustration therein, it is to be understood that the tube sheet 36 is also provided with a second grouping of such a series of isolated fluid circuits, which in turn collectively serve to comprise the plenum 62, to which reference has previously been had hereinbefore.

A description will now be had of the mode of operation of the leak detection system 40 constructed in accord with the present invention when utilized in an application such as that represented by the illustration of the structure, which is found depicted in FIG. 3 of the drawing. However, by way of a preface, a brief description will be set forth of one exemplary form of shop fabrication sequence that may be utilized for purposes of producing the type of structure that is shown in FIG. 3. To this end, in accord with the aforereferenced sequence, after the openings, i.e., tube holes 50 have been drilled through the tube sheet 36, the interconnecting passages, i.e., vents, which collectively comprise the plenum 62 and 64, respectively, are formed between the tube holes 50 such as by the use of electrodischarge machining, or any other known applicable technique. Some of the aforesaid interconnecting passages are shown in plan view in FIG. 2 and in cross-section in FIG. 3 of the drawing. As best understood with reference to FIG. 2, a multiplicity of separate leak detection circuits can be employed within the tube sheet 36 such that each one thereof is separated and independent from all the others. One advantage that stems from employing many such separate circuits is that it enables easier localization of a leak. Another is that it minimizes the number of tube holes 50 that become contaminated by fluid entering therein from one point of leakage.

Continuing with the description of this exemplary form of shop fabrication technique, the outer tubular member 32b is installed in the tube hole, i.e., opening 50, wherein it is welded in place, i.e., the welds 60 and 58 are made, and if needed, are subjected to being post-heated. Thereafter, the welds 60 and 58 are inspected. Next, the spacer member 52 is installed and the inside, i.e., inner, tubular member 32a is ball drifted into the outer tubular member 32b in order to achieve preload, i.e., and interference fit therewith, for effecting the heat transfer therebetween. Lastly, the inner tubular member 32a and spacer member 52 are welded to the tube sheet 36, i.e., the weld designated in FIG. 3 by reference numeral 56 is made. Post-heat treatment is then performed, and a final inspection is made of the completed work described above.

In accord with the preferred method of use and the best mode embodiment of the leak detection system 40 constructed in accord with the present invention, the steam generator 10 of FIG. 1 of the drawing comprises a steam generator, which is of the sodium/water type. That is, water/steam flows through the tubes 32 whereas sodium flows through the shell 12 in surrounding relation to the tubes 32. Moreover, in accord with the above, during normal operation of the steam generator 10 the fluid systems as constituted by the plenum 62 and 64 each contain a different inert gas. The latter are commonly selected from amongst the following inert gases: helium, argon and nitrogen. More specifically, plenum 62 preferably contains helium, which is known to have a higher thermal heat conductivity than other inert gases. In this regard, it is desirable that the plenum 62 contain a fluid that is characterized by having a high thermal heat conductivity. This is because of the fact that the plenum 62 in those applications involving the use of duplex tubes most often is connected in fluid flow relation with the space that exists between the inner and the outer tubular members, the latter together comprising a duplex tube. Plenum 64 on the other hand then would contain either argon or nitrogen, depending upon which gas is being used in other parts of the sodium system. That is, if, for example, argon is being used as a cover gas in a sodium surge tank, then nitrogen would be used in plenum 64, and vice versa. This is done to facilitate a detection of the commingling of inert gases caused by the establishment of a leak path therebetween.

With further reference to the plenums 62 and 64, the operating pressures of the fluids contained therein are purposely selected so that the respective values thereof lie intermediate the values of the pressures of the water and sodium that are contained within the steam generator 10. Namely, the operating pressures of the fluids contained in the plenums 62 and 64 are suitably selected so that the following relationships exist: $P_{H_2O} > P_{64} > P_{62} > P_{sodium}$, where $P_{H_2O}$ equals the water or steam generator pressure which typically is on the order of 2000 psig, $P_{64}$ is less than 2000 psig but greater than $P_{62}$, $P_{62}$ is less than $P_{64}$ but greater than $P_{sodium}$ and $P_{sodium}$ equals the sodium operating pressure which typically is on the order of 100 psig. These relationships between the various pressures ensures the predicability of the direction of flow of leak paths.

With further regard to FIG. 3 and more specifically the matter of the mode of operation of the leak detection system 40 of the present invention as applied to the form of construction of the steam generator 10 depicted therein, should a water/steam leak path come to be established through the weld 56 or else anywhere along the inner tubular member 32a, it will have the effect of increasing the pressure level in the plenum 62, assuming that the latter is otherwise leak tight, as well as the effect of increasing the hydrogen content or dew point of the inert gas, e.g., helium, in the plenum 62. Preferably, the instrument means embodied in the respective instrumentation packages 46, 48 are designed so as to be operative to respond separately to either changes in pressure level in the corresponding one of the plenums 62, 64 that is cooperatively associated therewith, or to changes in the composition of the gas that is contained therewithin. To this end, inasmuch as instruments embodying such capabilities are commonly available in the prior art it is not deemed necessary to further describe them herein, or to depict them in the drawing beyond the illustrations thereof which bear the reference numeral designations 46 and 48 in FIG. 1 of the drawing. However, should any additional reference to such instruments be deemed desirable, reference may be had for this purpose to the prior art which is replete with representative illustrations thereof. As a final note, recognition should be taken of the fact that it is contemplated that the instrumentation packages 46, 48 may each be designed so as to embody not only devices which are capable of sensing a deviation, i.e., change, in the pressure level or the nature of the gas compositions in the plenums 62, 64, but also devices that are capable of providing an alarm signal, either of an audible or of a visual nature or both, in response to the sensing of such deviations therewithin. With regard to the latter, note is made of the fact that devices capable of providing such alarm signals are conventional, i.e., well-known to those skilled in the instrument art, and as such it is deemed unnecessary herein to make further reference thereto.

In the context of the structure illustrated in FIG. 3 and more specifically the mode of operation of the leak detection system 40 of the present invention as applied thereto, the fluid system represented by the plenum 62 could be provided with a higher pressure capability such that it could be made to operate temporarily, i.e., for relatively short periods of time, at a level slightly greater than that of the water/steam system. Namely, this could be done so as to effect purging of the $H_2O$ content within the fluid system of plenum 62, i.e., to effect a reduction in the level thereof by slowly injecting an inert gas into the circuit. Such a course of action may be utilized in situations wherein the source of the $H_2O$ is a leak of relatively small magnitude.

Referring again to FIG. 3 of the drawing, the mode of operation of the leak detection system 40 of the present invention as applied thereto is such that a leak path confined to the weld 58 or a leak path that is confined within the portion of the outer tubular member 32b that is located between the welds 58 and 60 is identifiable and detectable when the following four trends or events occur simultaneously. Namely, there is a decrease in the pressure level of plenum 64, assuming that the latter is otherwise leak tight; there is an increase in the pressure level in plenum 62; there is an increase in the inert gas content of the gas in plenum 62, but there is no increase in the hydrogen or $H_2O$ content; and there is an apparent decrease or termination of the leakage from plenum 64 to plenum 62 when the pressure level becomes equalized therebetween. As concerns the latter, if the leakage from the plenum 64 still persists despite an equalization of the pressure between the plenum 64 and 62, this implies that an additional leak path exists between the plenum 64 and the sodium side of the sodium/water steam generator 10. Furthermore, with the form of construction illustration in FIG. 3, if the leakage path is confined to the weld 60 then the effect thereof would be that the pressure in the plenum 64 would decrease, and the pressure and inert gas content of the plenum 62 would not increase. Additionally, if a leak should develop in the tubular member 32b at a location therealong intermediate the two tube sheets 34 and 36, this would occasion a drop in the pressure of the fluid contained in the plenum 62.

It is to be understood that although the above description of the mode of operation of the leak detection system 40 as applied to the steam generator structure shown in FIG. 3 of the drawing has been limited to a discussion of the use thereof in cooperative association with the tube sheet 36, this description is equally applicable to the cooperative association of the leak detection system 40 with the tube sheet 34 of the steam generator 10 of FIG. 1. In this regard, if leakage is localized at only one of the tube sheets 34, 36, and is at a slow rate when first detected, normally it should be obvious which of the two tube sheets 34, 36 is experiencing the leakage.

Thus, to briefly summarize, the main advantage of the leak detection system 40 constructed in accord with the present invention compared to previously known forms of leak detection systems resides in the fact that the plenum 62, which is located adjacent to the water/steam side of the steam generator 10, is effectively separated from the plenum 64, which is located adjacent to the sodium side of the steam generator 10. This relationship in turn provides an effective safeguard against the occurrence of an undesirable sodium-water reaction event. Namely, if a significant amount of water should enter the plenum 62, the respective instrumentation package 46 or 48 would function to detect and signal the occurrence of such an event whereby appropriate corrective action could be initiated immediately. For example, by raising the pressure of the inert gas in plenum 62, the leakage direction could be reversed, thus purging, to some extent, the water out of the plenum 62. Further, simultaneously the pressure of the inert gas in the plenum 64 of the same circuit and perhaps of the circuits on either side thereof could be raised so as to exceed slightly the level of pressure existing in the plenum 62 whereby to prevent any trace of water from encroaching any closer to the sodium side of the steam generator 10, specifically in the event that there should occur a subsequent or comcomitant breach of the seal between the plenums 62 and 64. Moreover, if necessary to maintain levels of pressure sufficient for safeguarding purposes, high flows are attainable which are economically feasible because of the availability of suitable inert gases in bulk form and the existence of high pressure purging gasifier apparatus.

Referring next to FIG. 4 of the drawing, the structure depicted therein closely resembles that illustrated in FIG. 3, which has been described above. Accordingly, the same reference numerals have been employed in both FIG. 3 and FIG. 4 to identify like elements. Moreover, because the structure of FIG. 4 is substantially the same as that depicted in FIG. 3, it is not deemed necessary to describe herein in detail the structure of FIG. 4. Rather, should a description thereof be desired, reference may be had for this purpose to the description of the structure of FIG. 3 as set forth hereinabove.

The basic differences between the structures that are depicted in FIGS. 3 and 4, respectively, are essentially three in number. Namely, in accordance with the nature of the construction of the structure shown in FIG. 4, first, only a single plenum is employed, i.e., that designated therein by reference numeral 62; secondly, the outer tubular member, i.e., that designated therein by reference numeral 32b is essentially of the same length as the inner tubular member 32a thereby obviating the use of the spacer member 52 of FIG. 3; and thirdly, the plenum is made to extend through the outer tubular member 32b so as to be in fluid flow communication with the space that exists between the inner tubular member 32a and the outer tubular member 32b.

From the above description of the structure shown in FIG. 4 of the drawing, it should now be readily apparent that the leak detection system 40 constructed in accord with the present invention when applied thereto is intended to be operative to monitor the space between the inner tubular member 32a and the outer tubular member 32b. More specifically, the mode of operation of the leak detection system 40 of the present invention when applied to the structure of FIG. 4 is such that should a perforation occur in the inner tubular member 32a or should there be a failure of the weld 56, the leaking fluid in the form of $H_2O$, because it is at a higher pressure than the pressure of the fluid contained in the plenum 62, will attempt to make its way towards the plenum 62. Namely, should a perforation in the inner tubular member 32a occur as should the weld 56 fail, the direction of the leak path will be towards the plenum 62. Further, this flow of the leaking fluid, i.e., $H_2O$ towards the plenum 62 will be evidenced by an increase in the pressure of the fluid contained in the plenum 62 and/or by an increase in the $H_2O$ content of the fluid contained in the plenum 62. Now, on the other hand, should the outer tubular member 32b become perforated or should there be a failure of the weld 60, the pressure of the fluid contained in the plenum 62 will decrease. This is because the pressure of the fluid in the plenum 62, as noted previously herein, is greater than the pressure of the sodium. Thus, the direction of the leak path established as the result of the occurrence of a leak in the outer tubular member 32b or the failure of the weld 60 will be away from the plenum 62 and towards the sodium side of the steam generator 10. In summary, from the above it is seen that it is possible by knowing whether an increase or a decrease in pressure of the fluid contained in the plenum 62 takes place, and/or by knowing whether there has been a change in the $H_2O$ content of the fluid contained in the plenum 62 to postulate the probable source of a leak, i.e., that it is on the one hand either the inner tubular member 32a or the weld 56, or on the other hand that it is either the outer tubular member 32b or the weld 60, and the direction of the leak path that the leaking fluid will follow.

There are other advantages that accrue from the employment of a structure constructed as shown in FIG. 4. Namely, by forming the tubular members 32a and 32b as illustrated in FIG. 4, it is possible to duplex these tubular members 32a and 32b before they are assembled with the tube sheet 36, which from a manufacturing standpoint is desirable, in and of itself. Secondly, the form of construction shown in FIG. 4 renders it possible to achieve a reduction in the number of weld-postheat-inspect cycles that are required in the course of effectuating the assembly of the duplex tube 32 with the tube sheet 36. It can thus be seen that the leak detection system 40 when employed in the manner described above enables economies of manufacture to be realized in the course of producing the steam generator 10, while yet rendering it possible to retain the capability through the use of the leak detection system 40 both of being able to detect the occurrences of leaks and being able to postulate the probable source thereof as well as the direction of the leak path which the leaking fluid will follow.

Turning now to a consideration of FIG. 5 of the drawing, the structure depicted therein is essentially the same as that shown in FIG. 3. Accordingly, the same reference numerals have been utilized in both of these Figures to identify like elements. One major structural difference between the form of construction shown in FIG. 5 and that shown in FIG. 3 resides in the fact that in accord with the former only one plenum is employed, i.e., the plenum designated by the reference numeral 62 therein, whereas the latter form of construction is predicated upon the use of two plenums, i.e., the plenums designated by the reference numerals 62 and 64 therein.

The utilization of only one plenum as shown in FIG. 5 has the obvious desirable effect of simplifying the task involved in forming the tube sheet 36. Namely, it eliminates the need of providing a second set of passages therethrough. In addition, it has the concomitant effect of simplifying the structure which the instrument tube means 42 and the instrumentation package 46 embody. Both of the latter, as has previously been described herein and as depicted in FIG. 1, are designed to be cooperatively associated with the tube sheet 36 of the steam generator 10. On the other hand, the employment of a single plenum 62 in the manner exemplified by the showing thereof in FIG. 5 does impose somewhat of a limitation, in terms of flexibility, on the various uses to which the leak detection system 40 can be put. For instance, the utilization of a single plenum 62 limits the capability of detecting the occurrences of leaks and of identifying the sources of such leaks through the use of the leak detection system 40 as compared with that which is possible when employing a pair of plenums in each tube sheet such as in the manner exemplified by the showing of the plenums 62 and 64 in FIG. 3. This is largely attributable to the fact that it is not possible to generate as between plenums comparative sensings of pressure levels and/or changes in gas contents as between the fluid contained in the plenums when a given tube sheet embodies less than two plenums.

Continuing, with the form of construction that is illustrated in FIG. 5 of the drawing, should either the weld 56 or the weld 60 leak, a leakage path will be established through the opening 50 formed in the tube sheet 36 in surrounding relation to the tube 32 whereby communication is had between the leaking fluid and the plenum 62. This will in turn cause a deviation, i.e., change to be reflected in the pressure level and/or in the gas composition of the fluid that fills the plenum 62. Further, such a deviation is communicated from the plenum 62 by means of the instrument tube means 42 to the instrumentation package 46 whereat the deviation is sensed by the detector means which the latter embodies and a suitable indication thereof is promulgated.

More specifically, should the weld 56 leak, a leakage path will develop between the water side of the steam generator 10 and the plenum 62. Because the pressure of the $H_2O$ is greater than the pressure of the fluid in the plenum 62, the direction of the leakage path occasioned by a failure of the weld 56 will be towards the plenum 62. The occurrence of such a leak will occasion a commingling of $H_2O$ with the fluid contained in the plenum 62 which in turn will produce an increase in the pressure of the fluid in the plenum 62 as well as an increase in the $H_2O$ content of the fluid in plenum 62. Detection of such an increase in pressure of the fluid in plenum 62 and/or detection of a change in the $H_2O$ content of the fluid in plenum 62 evidences the occurrence of a leak and enables one to postulate the probable source of the leak as being the weld 56 and the direction of the leakage path as being towards the plenum 62.

On the other hand, should the weld 60 leak, a leakage path will develop between the sodium side of the steam generator 10 and the plenum 62. Because the pressure of the fluid in the plenum 62 is greater than the pressure of the sodium, the direction of the leakage path occasioned by the failure of the weld 60 will be away from the plenum 62. The occurrence of such a leak will in turn generate a decrease in the pressure of the fluid contained in the plenum 62. Thus, the detection of such a decrease in the pressure of the fluid contained in plenum 62 enables one to detect the occurrence of a leak as well as postulate based on the nature of the change in pressure of the fluid in plenum 62 that the probable source of the leak is the weld 60 and that the direction of the leakage path will be away from the plenum 62.

Figure 6:
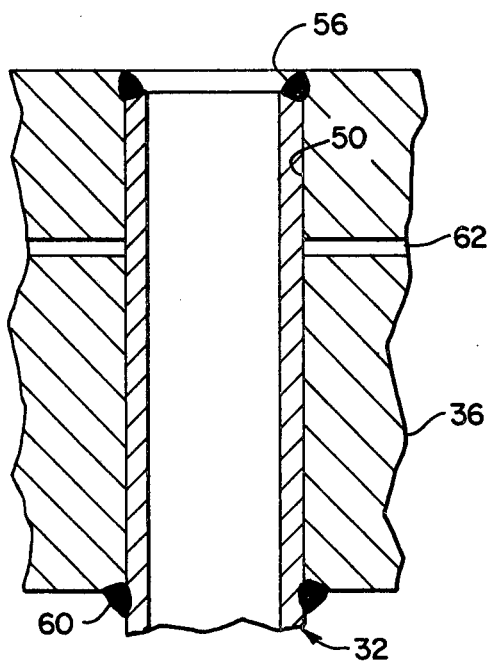
FIG. 6 is a cross-sectional view of a portion of a tube sheet of a steam generator illustrating a fourth method of use of a leak detection system constructed in accord with the present invention.

Turning now to a consideration of FIG. 6 of the drawing, the latter depicts a form of construction which involves the utilization of a single wall tube, e.g., the tube 32, and which like that shown in FIG. 5 also involves the use of only a single plenum, e.g., the plenum 62. In view of the similarity between the structure illustrated in FIG. 6 and that shown in FIG. 5 of the drawing, it is deemed proper to employ the same reference numerals to designate like elements in both of these Figures. Moreover, in view of the fact that the structure shown in FIG. 5 of the drawing has been described in detail hereinbefore, it is not deemed necessary for purposes of obtaining an understanding of the subject matter of the present invention, to repeat at this point a description of the corresponding like structure that is to be found depicted in FIG. 6. Rather, it is deemed sufficient simply to limit the discussion of the showing in FIG. 6 to a consideration of the mode of operation of the leak detection system 40 of the present invention as applied to the form of construction illustrated in FIG. 6.

To this end, there is shown in FIG. 6 a portion of the tube sheet 36 of the steam generator 10 of FIG. 1 wherein an opening 50 has been suitably provided therethrough, and in which opening 50 a single wall tube 32 has been suitably secured. More specifically, the tube 32 is welded to the outer surfaces of the tube sheet 36 by means of the welds 56 and 60. The plenum 62 is suitably formed in the tube sheet 36 so as to extend laterally therethrough such that the plenum 62 is in fluid flow communication with the opening 50, and more particularly, the exterior of the portion of the tube 32 that spans the space which exists between the two welds 56 and 60.

As with other forms of construction, i.e., those depicted in each of FIGS. 3, 4 and 5 of the drawing, the leak detection system 40 of the present invention when applied to the structure depicted in FIG. 6 of the drawing is equally applicable to being cooperatively associated therewith for purposes of effecting a sensing as to when a leak occurs. In addition to sensing therewith the development of leakage, the subject leak detection system 40 is likewise capable of being employed to determine the probable source of the leak as well as the direction of the leak path that the leaking fluid will follow. Thus, for example, should a leak develop through either of the welds 56 and 60, or should a leak occur that has been occasioned by a penetration in that portion of the tube 32 which extends between the welds 56 and 60, this will produce a deviation, i.e., change, in the pressure level and/or in the composition of the fluid which fills the plenum 62. The fact that such a deviation, i.e., change, has occured is communicated through the instrument tube means 42 to the instrumentation package 46 whereupon an appropriate indication will be given thereby of the existence of the leak. Moreover, through a sensing by the devices that are housed in the instrumentation package 46 of the nature of the deviation, it is possible to identify the leak as having originated from the water side or the sodium side of the steam generator 10.

More specifically, for the reasons previously described hereinbefore, should either the weld 56 fail or should a penetration occur in that portion of the tube 32 which extends between the welds 56 and 60, a leakage path will be established between the water side of the steam generator 10 and the plenum 62. Further, such a leak will occasion an increase in the pressure of the fluid contained in the plenum 62 and/or an increase in the $H_2O$ content of the fluid in plenum 62. A detection of the existence of either of these conditions enables one to thus postulate the probable source of the leak as being caused by either a failure of the weld 56 or a penetration of that portion of the tube 32 extending between the welds 56 and 60, and to determine that the direction of the leakage path will be towards the plenum 62. Similarly, should the weld 60 fail a leakage path will be established between the plenum 62 and the sodium side of the steam generator 10. As previously discussed herein, such a leak will occasion a decrease in the pressure of the fluid contained in plenum 62. Consequently, the detection of the existence of such a condition enables one to postulate the probable source of the leak as being a failure of the weld 60, and that the direction of the leakage path which the leaking fluid will follow will be away from the plenum 62.

To summarize, the establishment of any of the leakage paths referred to above causes a deviation to occur in the pressure level and/or gas composition in the fluid that fills the plenum 62. The existence of such deviations is communicated to the instrumentation package 46 whereby a suitable signal is given to alert an operator that such an event has taken place. Finally, a sensing of the nature of the deviation, i.e., change, by the instruments contained in the instrumentation package 46 enables an operator to identify the leak as having originated from either the water side or the sodium side of the steam generator 10.

Figure 7:
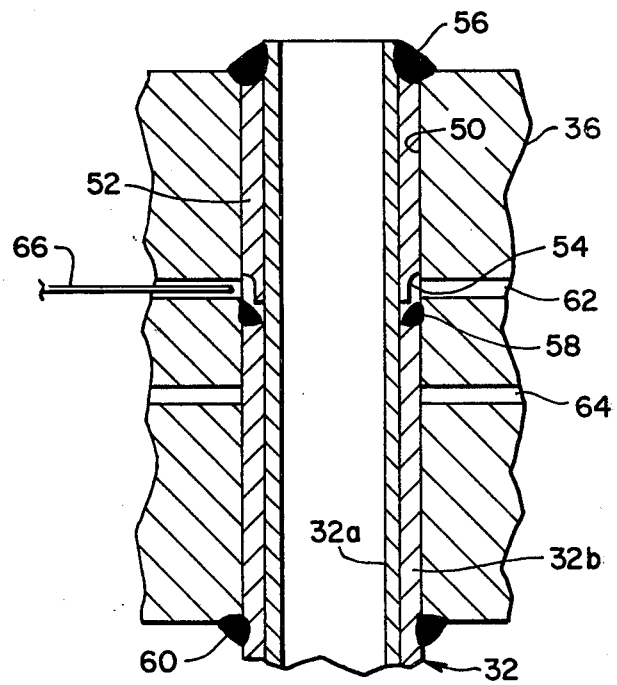
FIG. 7 is a cross-sectional view of a portion of a tube sheet of a steam generator illustrating an alternative form of construction of a leak detection system in accord with the present invention.

With reference lastly to FIG. 7 of the drawing, the latter depicts essentially the same structure as that found illustrated in FIG. 3 of the drawing. Namely, there is shown therein a portion of the tube sheet 36 having an opening 50 formed therethrough in which there is suitably retained a duplex tube 32 consisting of the inner tubular member 32a and the outer tubular member 32b with the latter being disposed in concentric relation to the former. In addition, a spacer member 52 is preferably disposed also in concentric relation to the inner tubular member 32a such that the spacer member 52 and the outer tubular member 32b combined are substantially equal in length to the inner tubular member 32a as viewed with reference to FIG. 7. Preferably, the end of the spacer member 52 which is positioned in juxtaposed relation to the end of the outer tubular member 32b is cutaway at 54 in the manner of the structure illustrated in FIG. 3. The retention of the duplex tube 32 in the opening 50 of the tube sheet 36 is preferably accomplished through the employment of a plurality of spaced welds 56, 58 and 60. Finally, the tube sheet 36 is provided with a pair of plenums 62 and 64 in the manner of the structure of FIG. 3. The plenums 62 and 64 are operative for purposes of providing a fluid interconnection between particular ones of the openings 50 such as to define separate and fluidically isolated circuits in the tube sheet 36. In order to improve the sensitivity of the fluid circuitry by which deviations, i.e., changes in pressure level and/or in composition of the fluid that fills the plenum 62 are transmitted through the instrument tube means 42 to the instrumentation package 46, the present invention contemplates the insertion into the plenum 62 of a member such as that identified by the reference numeral 66 in FIG. 7. The effect of utilizing the member 66 in the manner depicted in FIG. 7 is to reduce the volume of the passage in which the aforesaid member 66 has been emplaced. Such a reduction in volume produces in known fashion a concomitant increase in the sensitivity of the fluid circuitry. Although not shown in FIG. 7 the plenum 64 could equally well be provided with a member, i.e., a wire, in the same manner that the plenum 62 is provided with the member 66.

From the above, it should now be readily apparent that the leak detection system 40 constructed in accordance with the present invention is equally applicable for use in a variety of different applications. Moreover, when employed in any of the latter applications, the subject leak detection system 40 is operative not only to sense the occurrence of a leak, but also is operative to identify whether the leak originated from the water side or the sodium side of the steam generator 10, and accordingly the direction of the path of flow that the leaking fluid will take. Further, the leak detection system 40 enables one to postulate the probable locality of the leak, i.e., in which tube sheet the leak has occurred, and more particularly which group of openings 50 is involved, e.g., the isolated fluid circuit constituted by the openings identified by the reference numeral 50a, etc.

Thus, in accordance with the present invention there has been provided a new and improved form of leak detection system that is suitable for use in a steam generator and which is operable therein for purposes of detecting a leak that could give rise to the commingling of a pair of operating fluids that desirably are designed to flow through the steam generator in fluid isolation one to another. Moreover, the leak detection system of the present invention is operable to detect a leak of an operating fluid in a steam generator caused by a tube failure. In addition, in accord with the present invention, the leak detection system is operable to detect a leak caused by a tube failure wherein the tube is a single tube, i.e., of single wall construction. Further, the leak detection system of the present invention is operable to detect a leak caused by a tube failure wherein the tube is a duplex tube, i.e., of double wall construction. Additionally, in accordance with the present invention a leak detection system is provided which is operable to detect a leak of an operating fluid in a steam generator caused by a weld failure. Also, the leak detection system of the present invention is operable to detect a leak of an operating fluid in a steam generator caused by the combination of a tube failure and a weld failure. Finally, in accord with the present invention a leak detection system is provided which embodies the capability of enabling a determination to be had as to the probable location and/or direction of flow of the leak that has been sensed, based on the sensing thereof that has been made thereby.

While several different applications in which the leak detection system of our invention is employable have been depicted in the drawing and have been described herein, it will be appreciated that other uses, some of which have been alluded to hereinabove, can be made thereof by those skilled in the art without departing from the essence of the invention. We, therefore, intend by the appended claims to cover such other uses alluded to herein as well as all others, which fall within the true spirit and scope of our invention.

We claim:

1. In a steam generator having at least one tube sheet supported therewithin so as to extend transversely of the major axis of the steam generator, said tube sheet embodying a unitary construction operable to define the thickness thereof, said tube sheet having a multiplicity of tube holes formed through the thickness thereof, and a multiplicity of duplex tubes embodying a double wall form of construction each having one end thereof retained by welding in a corresponding one of said multiplicity of tube holes, the improvement comprising a leak detection system operable to detect the occurrence of a leak that could give rise to the commingling of a pair of operating fluids that desirably are designed to flow through the steam generator in fluid isolation one to the other as well as to provide a determination as to the probable source of the leak and the direction of flow of the leaking fluid, one of the pair of operating fluids that flow through the steam generator being at a pressure greater than the pressure of the other one of the pair of operating fluids that flow through the steam generator, said leak detection system comprising:

a. interconnecting means establishing a fluidic interconnection between pairs of said multiplicity of tube holes;
   b. plenum means fluidically interconnecting selective ones of said interconnecting means so as to establish within said tube sheet a plurality of separate and independent fluidic circuits each isolated from all the others, said plenum means being filled with fluid having a different composition than either of the pair of operating fluids that are made to flow through the steam generator, the fluid of said plenum means having a pressure intermediate the pressures of the pair of operating fluids that flow through the steam generator, said plenum means forming a portion of the leakage path when a leak occurs such that the leaking fluid becomes commingled with the fluid filling said plenum means thereby causing a change to occur in the pressure and/or composition of the fluid filling said plenum means;
   c. instrument tube means connected in fluid flow relation with said plenum means, said instrument tube means being operative to receive from said plenum means information in fluidic form as to the occurrence of a change in the pressure and/or composition of the fluid filling said plenum means; and
   d. an instrumentation package fluidically interconnected with said instrument tube means and therethrough to said plenum means, said instrumentation package being operative to indicate from the information received in fluid form from said instrument tube means that when the pressure of the fluid in said plenum means is sensed to have decreased the leaking fluid is the lower pressure fluid flowing through the steam generator and the direction of flow of the leaking fluid is away from said plenum means, and to indicate that when the pressure of the fluid in said plenum means is sensed to have increased the leaking fluid is the higher pressure fluid flowing through the steam generator and the direction of flow of the leaking fluid is towards said plenum means.

2. In a steam generator wherein the improvement comprises a leak detection system as set forth in claim 1, said plenum means comprising a pair of plenums, each of said pair of plenums being fluidically interconnected to said instrument tube means, said pair of plenums selectively forming a portion of the leakage path when a leak occurs depending upon the point of leakage.

3. In a steam generator wherein the improvement comprises a leak detection system as set forth in claim 2, each of said pair of plenums being filled with a fluid having a composition that is different than the fluid that fills the other of said pair of plenums, the fluids that fill said pair of plenums also being of a composition that is different than the composition of the pair of operating fluids that flow through the steam generator, the fluid that fills one of said pair of plenums having a pressure intermediate the pressure of the pair of operating fluids that flow through the steam generator, and the fluid that fills the other of said pair of plenums having a pressure intermediate the pressure of the pair of operating fluids that flow through the steam generator but less than the pressure of the fluid that fills said one of said pair of plenums.

4. In a steam generator wherein the improvement comprises a leak detection system as set forth in claim 3, said instrumentation package being operative to indicate from the information received in fluidic form from said instrument tube means that when the pressure of the fluid in said one of said pair of plenums is sensed to have increased the leaking fluid is the higher pressure operating fluid and the direction of flow of the leaking fluid is towards said one of said pair of plenums.

5. In a steam generator wherein the improvement comprises a leak detection system as set forth in claim 4, said instrumentation package being operative to indicate from the information received in fluidic form from said instrument tube means that when the pressure of the fluid in said other of said pair of plenums is sensed to have decreased the leaking fluid is the lower pressure operating fluid and the direction of flow of the leaking fluid is away from said other of said pair of plenums.

6. In a steam generator wherein the improvement comprises a leak detection system as set forth in claim 1 further including means emplaced within said plenum means operable for improving the sensitivity of the leak detection system.

7. In a steam generator having at least one tube sheet supported therewithin so as to extend transversely of the major axis of the steam generator, said tube sheet embodying a unitary construction operative to define the thickness thereof, said tube sheet having a multiplicity of tube holes formed through the thickness thereof, and a multiplicity of single wall tubes each having one end thereof retained by welding in a corresponding one of said multiplicity of tube holes, the improvement comprising a leak detection system operable to detect the occurrence of a leak that could give rise to the commingling of a pair of operating fluids that desirably are designed to flow through the steam generator in fluid isolation one to the other as well as to provide a determination as to the probable source of the leak and the direction of flow of the leaking fluid, one pair of operating fluids that flow through the steam generator being at a pressure greater than the pressure of the other one of the pair of operating fluids that flow through the steam generator, said leak detection system comprising:

a. interconnecting means establishing a fluidic interconnection between pairs of said multiplicity of tubes holes;
b. plenum means fluidically interconnecting selective ones of said interconnecting means so as to establish within said tube sheet a plurality of separate and independent fluidic circuits each isolated from all the others, said plenum means being filled with fluid having a different composition than either of the pair of operating fluids that are made to flow through the steam generator, the fluid of said plenum means having a pressure intermediate the pressures of the pair of operating fluids that flow through the steam generator, said plenum means forming a portion of the leakage path when a leak occurs such that the leaking fluid becomes commingled with the fluid filling said plenum means thereby causing a change to occur in the pressure and/or composition of the fluid filling said plenum means;
c. instrument tube means connected in fluid flow relation with said plenum means, said instrument tube means being operative to receive from said plenum means information in fluidic form as to the occurrence of a change in the pressure and/or composition of the fluid filling said plenum means; and
d. an instrumentation package fluidically interconnected with said instrument tube means and therethrough to said plenum means, said instrumentation package being operative to indicate from the information received in fluid form from said instrument tube means that when the pressure of the fluid in said plenum means is sensed to have decreased the leaking fluid is the lower pressure fluid flowing through the steam generator and the direction of flow of the leaking fluid is away from said plenum means, and to indicate that when the pressure of the fluid in said plenum means is sensed to have increased the leaking fluid is the higher pressure fluid flowing through the steam generator and the direction of flow of the leaking fluid is towards said plenum means.

8. In a steam generator wherein the improvement comprises a leak detection system as set forth in claim 7, wherein one of the pair of operating fluids that flow through the steam generator is $H_2O$ having a pressure of approximately 2000 psig.

9. In a steam generator wherein the improvement comprises a leak detection system as set forth in claim 8, wherein the other of the pair of operating fluids that flow through the steam generator is sodium having a pressure of approximately 100 psig.

10. In a steam generator wherein the improvement comprises a leak detection system as set forth in claim 9, wherein the fluid that fills said plenum means is helium.

* * * * *